(12) United States Patent
Jordan

(10) Patent No.: US 7,438,409 B2
(45) Date of Patent: Oct. 21, 2008

(54) ILLUMINATED READING GLASSES

(76) Inventor: Lonnie (Leroy) Jordan, 15235 La Calma Dr., Whittier, CA (US) 90605

( * ) Notice: Subject to any disclaimer, the term of this patent is extended or adjusted under 35 U.S.C. 154(b) by 0 days.

(21) Appl. No.: 11/255,626

(22) Filed: Oct. 21, 2005

(65) Prior Publication Data

US 2007/0013865 A1    Jan. 18, 2007

Related U.S. Application Data

(60) Provisional application No. 60/699,708, filed on Jul. 15, 2005.

(51) Int. Cl.
*G02C 1/00*    (2006.01)
(52) U.S. Cl. .......................................... 351/158; 351/41

(58) Field of Classification Search .................. 351/41, 351/44, 49, 158
See application file for complete search history.

(56) References Cited

U.S. PATENT DOCUMENTS

| | | | | | |
|---|---|---|---|---|---|
| 4,234,910 | A | * | 11/1980 | Price | 362/105 |
| 5,331,357 | A | * | 7/1994 | Cooley et al. | 351/158 |
| 5,722,762 | A | * | 3/1998 | Soll | 362/105 |
| 6,824,265 | B1 | * | 11/2004 | Harper | 351/158 |

* cited by examiner

*Primary Examiner*—Huy K Mai
(74) *Attorney, Agent, or Firm*—David R. Stevens; Stevens Law Group

(57) ABSTRACT

An illumination system and method are provided for use in conjunction with eyewear that includes a light source, a power switch configured to connect the light source to a power source and a light output configurable to be embedded within the eyewear, and to direct light to a remote location. The light output may be adjustable in various directions, intensity levels and focus.

31 Claims, 5 Drawing Sheets

Figure 1:
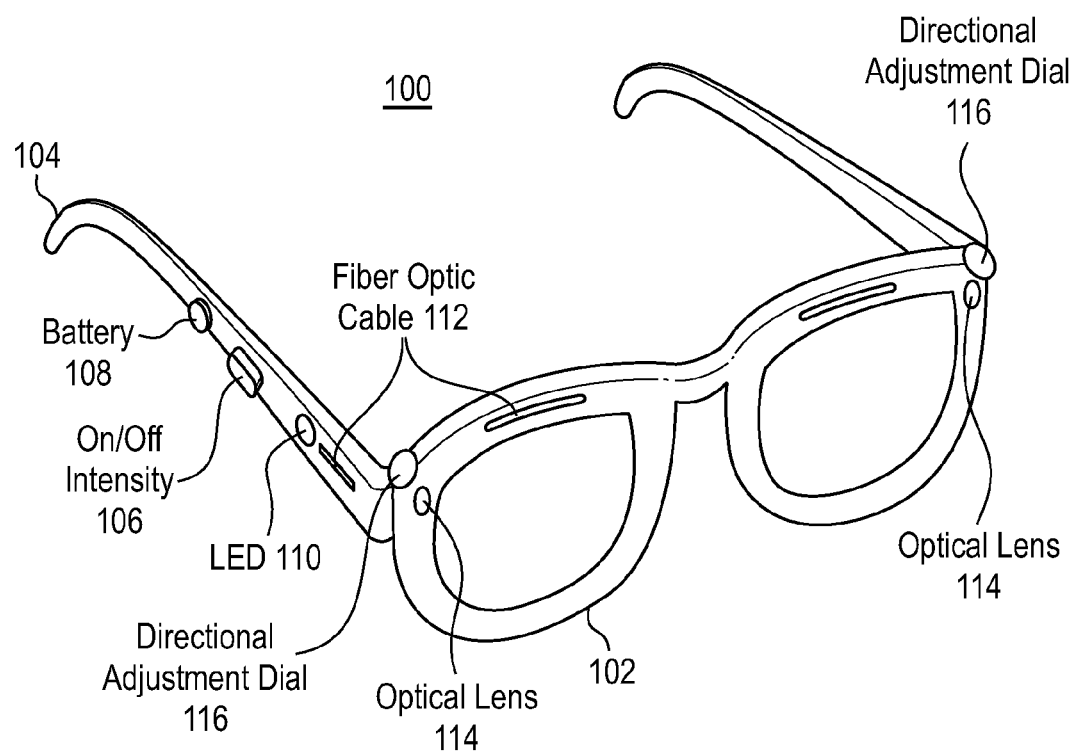

ILLUMINATED READING GLASSES

RELATED APPLICATIONS

This application is a conversion of U.S. Provisional Patent Application No. 60/699,708, filed on Jul. 15, 2005.

BACKGROUND

This invention relates to eyewear that incorporates a light source, or light sources to assist in visibility in poorly lit areas and, more particularly, to a user adjustable illumination system embedded within the eyewear frame that adapts well to a user's preferences as well as external visibility conditions.

The need for proper illumination of an item for viewing in a poorly lit areas is known, as is the use of lights and other illuminating devices attached to eyewear to create an illuminated surface. In general, assumptions are made regarding focal distances and light intensities when designing these devices. With reading glasses for example, these assumptions are often based on accepted norms such as average distance between the reading material and the eye glasses, and commonly used print, or font sizes. The result is a single light source, or multiple light sources that are either snapped on, or otherwise permanently mounted to existing reading glasses that uni-directionally focus the light to a predetermined focal range at a given intensity. Therefore the devices are not readily adjustable to either user preferences or reading conditions There are however many variables that non-adjustable reading lights do not account for, yet are necessary for creating a comfortable reading environment for the eyes. For example, a person's age or optical health determines how well one's optic nerve receives light and thus one's comfortable focal distance under variable lighting conditions. The type, color, and quality of the paper the reading material is printed on also affects the amount of light required. Newspapers and most books use a soft, off-white paper that absorbs light and minimizes glare. Magazines on the other hand are often printed on high gloss white paper that requires a lower intensity, diffused light source for maximum eye comfort. The amount and directional location of any ambient light also needs to be considered and adjusted for. The inability to adjust to these and other variables may result in increasing the potential for eye strain or eye fatigue rather than minimizing it. Accordingly, there is a need for lighted glasses that assist in reading in poorly lit areas. More particularly, reading glasses where the light source is fully adjustable in terms of light intensity and direction of the light beams. Furthermore, it would be desirable if the glasses would incorporate a single light source and power source for efficiency packaged in a non-intrusive, comfortable and aesthetically pleasing manner.

The limitations of using incandescent light bulbs for this application is known. More commonly this application uses LED's as the light source. LED's are a low power light source that offer a high lumen light emission. Prior art LED lighting devices that were attached to existing eye glass frames packaged LED's and their power sources independently, and then each package was mounted to the eye glass frame. One disadvantage in this prior art is that multiple power sources are required in addition to multiple LED's. Another disadvantage to this prior art is the package size of the external package. The size and location of the external mounted lighting devices can make wearing the glasses uncomfortable for the user. Furthermore, from an aesthetic point of view, conventional mounted lighting devices are cumbersome and may be considered unfashionable to users.

Additionally, these same constraints and variables may be applied in areas other than recreational reading as well. For example, many jobs require workers to perform their duties in poorly lit work environments in an area where it is impractical to bring in an external light source. One such example of this would be a repairman working on downed power lines at night. Accordingly there is a need for lighted protective eyewear that assists users in performing their job duties. Furthermore, it would be desirable that the lighted protective eyewear is fully adjustable in terms of light intensity and direction of the beams.

As will be seen, the invention accomplishes this in an elegant manner.

BRIEF DESCRIPTION OF THE DRAWINGS

FIG. 1 is an illustration showing a configuration of illuminated eyeglasses that is configured with the electrical and some mechanical adjustment devices located in the earpiece of the eyeglasses, and the light output and other mechanical adjustment devices located in the eyeglass frame.

FIG. 2 is an illustration showing configuration of illuminated protective eyewear that is configured to include all components in the eyewear frame.

FIG. 3 is a schematic of the electrical circuit configuration

FIG. 4 is an illustration showing left to right adjustment range of the light output FIG. 5 is an illustration showing an up-down adjustment range of the light output FIG. 6 is an illustration showing a ball joint device that may be used to mechanically adjust the light output in a two dimensional manner;

FIG. 7 is an illustration showing an adjustment range for the focus of the light output from a relatively broad beam pattern to a highly focused beam pattern

DETAILED DESCRIPTION

In addressing the problems of the prior art, the invention is directed to an illumination system for use in conjunction with eyewear that is fully adjustable in terms of light intensity and direction of the light beams. Furthermore, the invention may provide a means to fully adjust the focus of the light beams from a narrow point of light to a relatively broad beam of light. This addresses the problem of eye strain caused by poor lighting by allowing the user to adjust the light beams to cover the precise area desired of the item being viewed. Additionally, the invention may provide a means to adjust the intensity of the light projected onto the item being viewed. This addresses the problem of eye fatigue caused by improper lighting by allowing the user to adjust how brightly an item is illuminated, thus preventing the need to stare at an item that is too dark, or the glare off an item that is too brightly illuminated. Furthermore, the invention may provide a means to adjust the directional focus of the light to the item being viewed. This addresses the problems of using an assumed focus distance which is fixed by allowing the user to adjust the direction of the light output so as to focus on an item at a distance that provides maximum eye comfort to the user.

The invention addresses concerns expressed in the prior art regarding using LED's as the light source by using high intensity LED's that emit white light, such as the Luxeon™ series LED's manufactured by Lumileds™. These LED's have a high flux output, 100,000 hour lifespan, operate on a low dc voltage input signal, are fully dimmable, and operate at cool temperatures, making them ideal for embedding into the eyeglasses. Of course, those skilled in the art will understand that various types of high intensity LED's are available in the industry, and that the invention is not limited to any particular configuration or design of a particular LED."

An illumination system and method are provided for use in conjunction with eyewear that includes a light source, a power switch configured to connect the light source to a power source and a light output configurable to be embedded within the eyewear, and to direct light to a remote location. The light output may be adjustable in various directions, intensity levels and focus. The invention may include a mechanical adjustment device configured for manual adjustment by a user to manually adjust the intensity of the light output to a remote location. The adjustment device may be configured as a dial for adjusting the intensity of the light. The adjustment device may be configured as a push button switch of predetermined number of positions, preset to provide a plurality of light intensity levels. The adjustment device may be configured as a touch pad switch wherein the user may adjust the intensity of the light by touching or sliding his finger along any point of the pad. The adjustment device may be configured to be embedded within the frame of the eyewear.

The system may include an adjustment device configured to allow a user to manually adjust the focus of the directed light from a focused light point to a relatively broad lighted area. The adjustment device may be configured as a dial for adjusting the focus of the light. The adjustment device may be configured to be embedded within the frame of the eyewear.

The illumination system may further include an adjustment device configured to allow a user to manually adjust the intensity of the directed light to remote locations; and another adjustment device configured to allow a user to manually adjust the focus of the directed light.

The light from the light source and the light output is configured so as to prevent glare or stray light from being focused directly into the users eyes. The light output is configured on the end of a light pipe. A light pipe is a transparent tube lined with optical film which is highly reflective to light striking the surface of the film at certain angles, and is transmissive at other angles.

In another embodiment, the illumination system may be configured for use in conjunction with protective eyewear and include a power source, configured to provide power to the light source; a power switch embedded within the protective eyewear and configured to activate the system; a light source; and a light output embedded within the protective eyewear and configured to direct light to a remote location. The system may further include a mechanical adjustment device configured for manual adjustment by a user to manually adjust the intensity of the light output to a remote location. The adjustment device may be configured as a dial for adjusting the intensity of the light. The adjustment device may be configured as a push button switch of predetermined number of positions, preset to provide a plurality of light intensity levels. The adjustment device may be configured as a touch pad switch wherein the user may adjust the intensity of the light by touching or sliding his finger along any point of the pad. The adjustment device may be configured to be embedded within the frame of the eyewear. The protective eyewear may be sunglasses, may have light adjustment within the lenses, or they may be safety glasses. The system may also include an adjustment device configured to allow a user to manually adjust the focus of the directed light from a focused light point to a relatively broad lighted area. The adjustment device may be configured as a dial for adjusting the focus of the light. The adjustment device may be configured to be embedded within the frame of the eyewear. The system may further include an adjustment device configured to allow a user to manually adjust the intensity of the directed light to remote locations; and another adjustment device configured to allow a user to manually adjust the focus of the directed light. The light from the light source and the light output is configured so as to prevent glare or stray light from being focused directly into the users eyes. The light source is configured to be a light emitting diode. The system may further include a light transmission device such as a fiber optic cable, configured to transmit light from the light source to the light output. The power source may be configured to be rechargeable. Furthermore, the power source may be configured to be rechargeable by either electronic or manual means. The light output may be configured to be an optical lens. The optical lens may be configured to be adjustable by mechanical means to adjust the direction of the light beam in a two dimensional manner to a remote location. The adjustment device may be configured as a ball that rotates to adjust the directed light.

Figure 2:
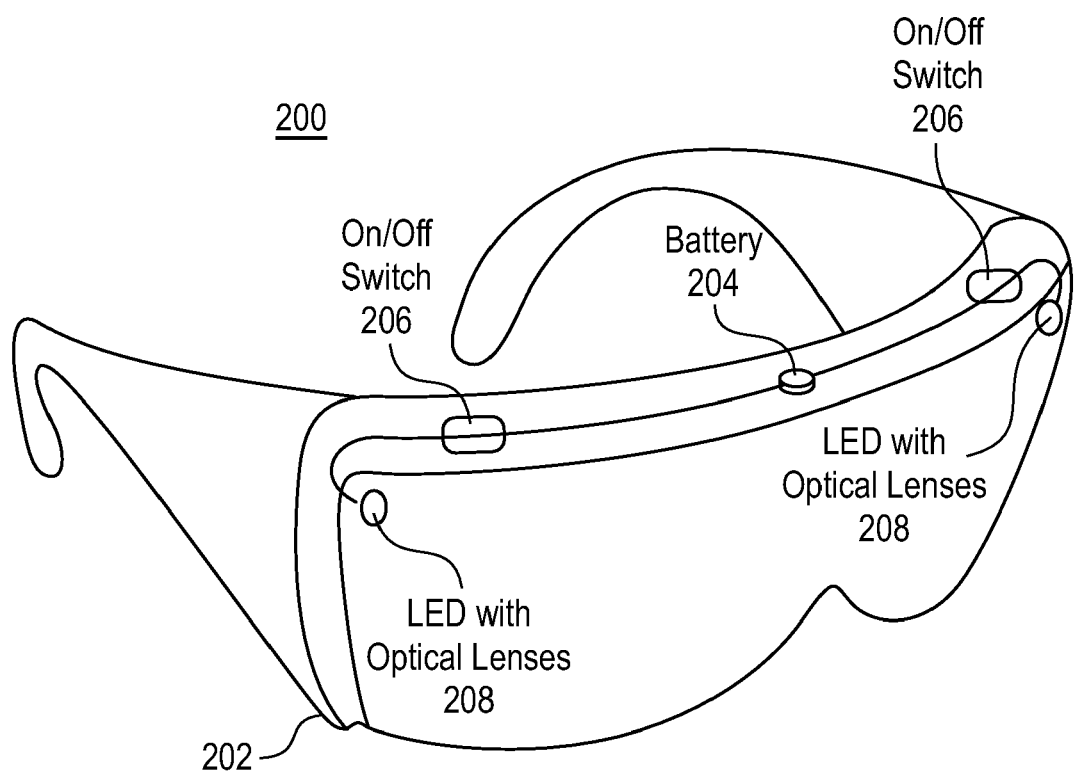

Referring to FIG. 1, one embodiment is illustrated where the invention is configured for use in a pair of reading glasses. The reading glasses are comprised of eyeglass frames 102, and earpieces 104, the configuration of each being widely known. In this particular embodiment, the invention is configured with a power source 108, which may be a battery, with an output connected to a switch 106. The switch 106, which may be a dial type switch, consists of an input connected to a power source 108, and an output connected to a light source 110. In this particular embodiment, the switch 106, is configured to turn the system on or off by rotating the dial. Additionally, in this particular embodiment, the switch is further configured to control the intensity of the light output of the light source 110, by the user manually rotating the dial in either a clockwise, or counter-clockwise direction. The light source 110, which may be a light emitting diode (LED) is configured to emit light when power is supplied to it. In this particular embodiment, a light transmitting device 112, which may be a fiber optic cable, is connected to the light source 110, The output of the light transmitting device 112, is connected to two light outputs 114, which may be optical lenses, one attached to each template of the eyeglass frame 102. In this particular embodiment, also connected to each light output is a mechanical adjustment device 116, which may be a dial, configured to adjust the direction of the light emitting from the light outputs 114. Referring to FIG. 2, another embodiment is illustrated where the invention is configured for use in protective eyewear 202. In this particular embodiment, the invention is configured with a power source 204, which may be a battery, with an output connected to two switches 206. The switches 206, which may be dial type switches, each consists of an input connected to the power source 204, and an output connected to a light source 208. In this particular embodiment, each switch 206, is configured to turn the system on or off by rotating the dial independent of the status of the other switch. Additionally, in this particular embodiment, each switch is further configured to control the intensity of the light output of the light source 208, by the user manually rotating the dial in either a clockwise, or counter-clockwise direction. The light source 208, which may be a light emitting diode (LED) is configured to emit light when power is supplied to it. Furthermore, the LED is configured with an optical lens which directs the emitted light from the LED in a controlled manner.

Of course, those skilled in the art will understand that various types of components identified in these particular embodiment are available in the industry, and that the invention is not limited to any particular configuration or design.

Figure 3:
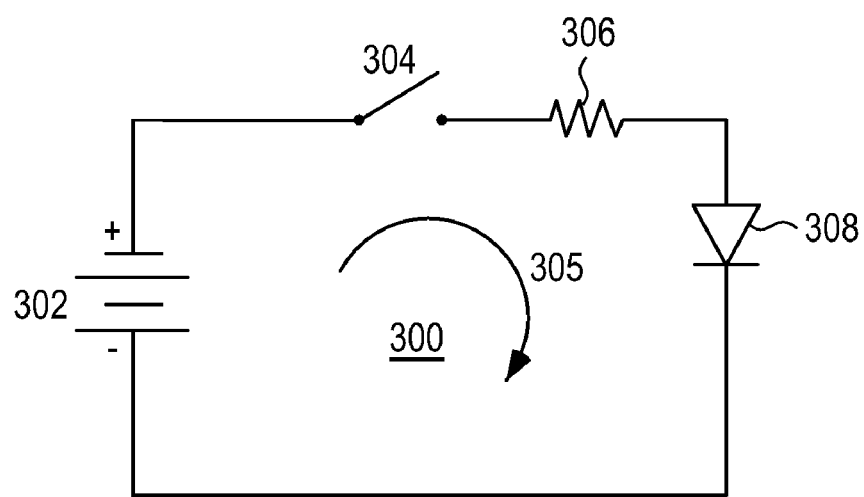

FIG. 3 is a schematic of the electrical circuit configuration, Referring to FIG. 3, circuit 300 includes a voltage source 302 for providing power to the circuit. Switch 304 is configured to power the circuit on by closing the loop 305. Potentiometer 306 or other voltage adjustment is included to manually adjust the intensity of the light delivered to LED 308 by controlling the voltage delivered thereto. According to the invention, this is a basic circuit configured to power on the system and to control the intensity of the light delivered by the LED's embedded in the eyewear.

Figure 4:
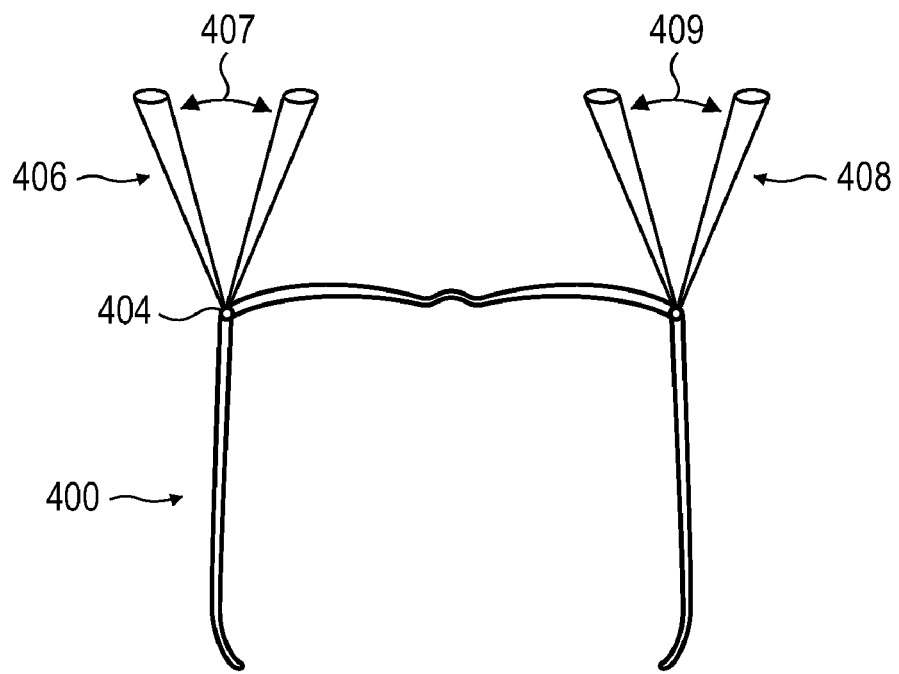

FIG. 4 is an illustration showing a left to right adjustment range of the light output. Referring to FIG. 4, a top view of a pair of eyeglasses is shown configured with the invention. In this illustration, the eyeglasses are configured with mechanical adjustment devices that allow the user to adjust the direction of the light output from the light sources 404 independent of each other to the left or to the right, 407 and 409, for improved visibility. The conical projections are representative of a light output pattern from the temples of the glasses shown in the left most 406, and right most 408, positions of an adjustment range.

Figure 5:
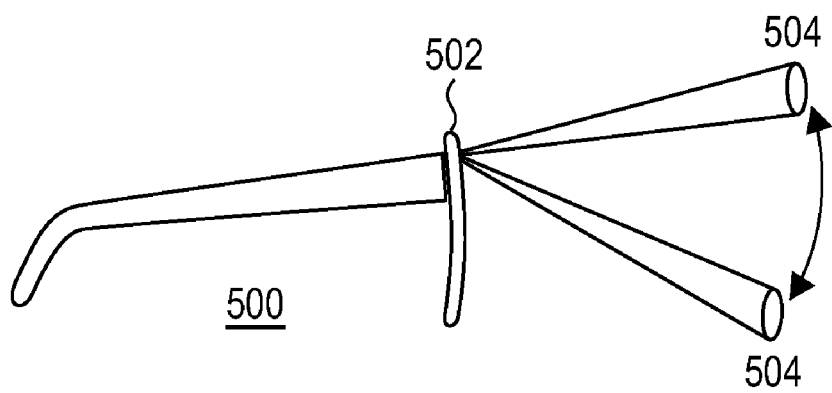

FIG. 5 is an illustration showing a up-down adjustment range of the light output. Referring to FIG. 5, a top view of a pair of eyeglasses is shown configured with the invention. In this illustration, the eyeglasses are configured with mechanical adjustment devices that allow the user to adjust the direction of the light output from the light sources 502, independent of each other up or down for improved visibility. The conical projections are representative of a light output pattern from the temples of the glasses shown in the upper most 504, and lower most 506, positions of an adjustment range.

Figure 6:
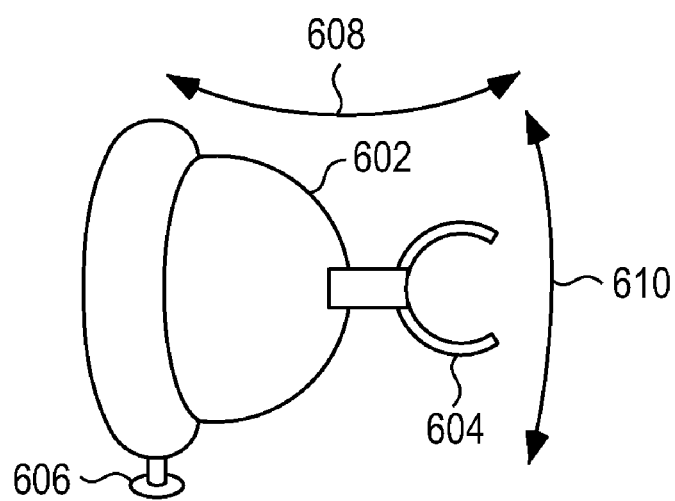

FIG. 6 is an illustration showing a ball joint device that may be used to mechanically adjust the light output in a two dimensional manner. Referring to FIG. 6, a ball joint 602 is shown configured with a clip 604, to hold a fiber optic cable. The ball joint is attached to a mount 606 that is fixed to the frame of the eyewear. Those skilled in the art will know that this type of joint is designed to pivot along both the X-axis 608, and the Y-axis 610. The result of this motion is illustrated in FIGS. 5 and 6. Additionally, those skilled in the art will know that various types of components are available in the industry that may be used to mechanically adjust the light output and that the invention is not limited to any particular configuration or device.

Figure 7:
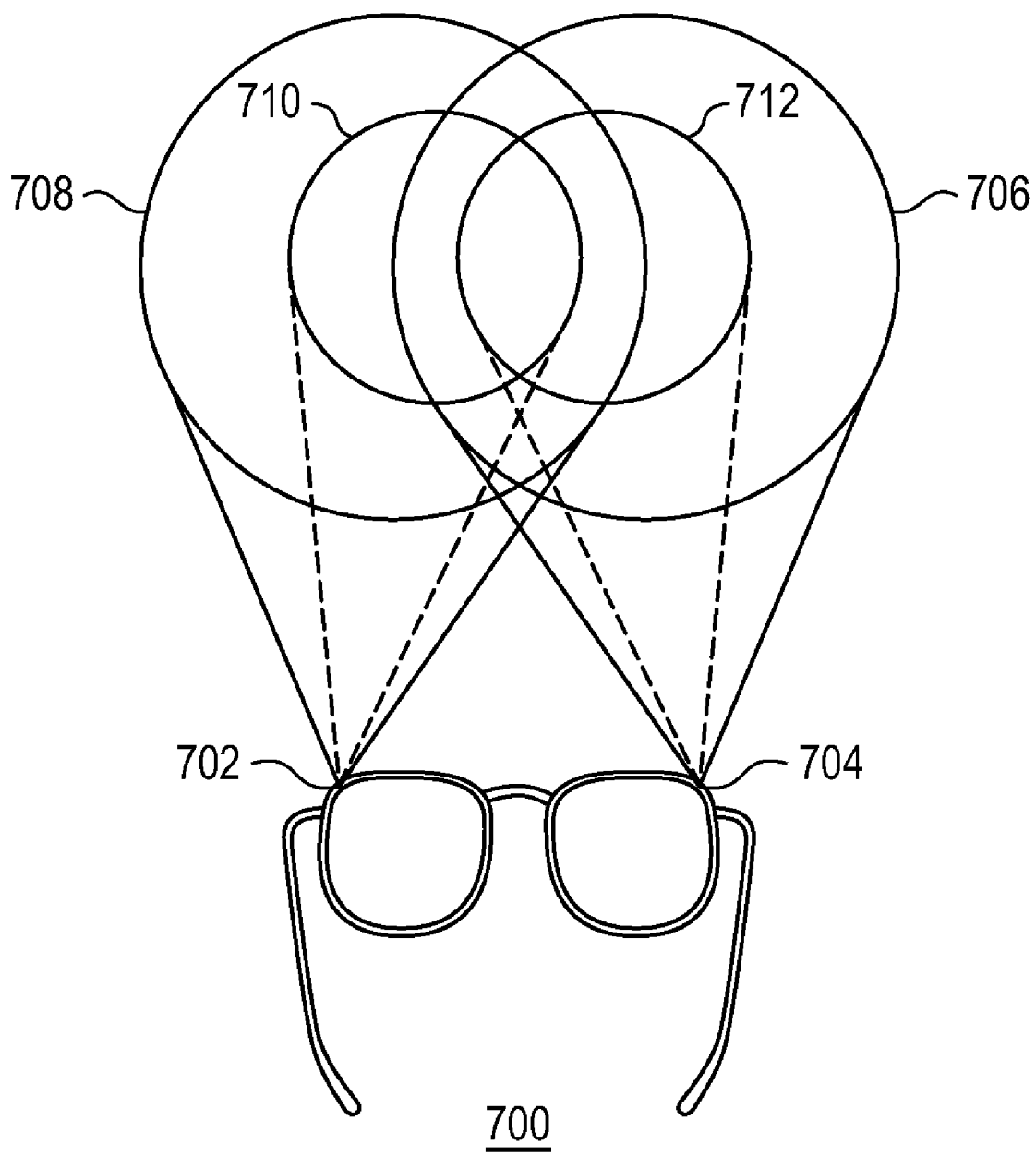

FIG. 7 is an illustration showing an adjustment range for the focus of the light output from a relatively broad beam pattern to a highly focused beam pattern. Referring to FIG. 7, the light beams, 702 and 704, are projected out from the glasses to the illuminated surface as relatively broad, overlapping circles, 706 and 708. The user may adjust the focus and thus the light intensity of the projected beams using a mechanical adjustment similar to that on a flash light whereas the optical lens is rotated, moving the lens closer or farther away from the light source. The narrower, more focused light beam pattern, 710 and 712, appears on the illuminated surface as smaller, overlapping circles. Those skilled in the art will know that various types of components are available in the industry that may be used to mechanically adjust the focus and intensity of the light output and that the invention is not limited to any particular configuration or device.

The invention claimed is:

1. An illumination system for use in conjunction with eyewear comprising:
    a light source embedded in the eyewear;
    a power switch configured to connect the light source to a power source; and
    a light transmitting device configurable to be embedded within the eyewear wherein light intensity and direction of light from the light source are selectively controlled.

2. An illumination system according to claim 1, further comprising:
    a mechanical adjustment device configured for manual adjustment by a user to manually adjust the intensity of the light output to a remote location.

3. An illumination system according to claim 2, wherein the adjustment device may be configured as a dial for adjusting the intensity of the light.

4. An illumination system according to claim 2, wherein the adjustment device is configured as a push button switch of predetermined number of positions, preset to provide a plurality of light intensity levels.

5. An illumination system according to claim 2, wherein the adjustment device is configured as a touch pad switch for adjustment of the intensity of the light can be done by a user touching along the pad.

6. An illumination system according to claim 2, wherein the adjustment device is configured to be embedded within the frame of the eyewear.

7. An illumination system according to claim 1, further comprising:
    an adjustment device configured to allow a user to manually adjust the focus of the directed light from a focused light point to a relatively broad lighted area.

8. An illumination system according to claim 7, wherein, the adjustment device is configured as a dial for adjusting the focus of light.

9. An illumination system according to claim 7, wherein the adjustment device is configured to be embedded within the frame of the eyewear.

10. An illumination system according to claim 1, further comprising:
    an adjustment device configured to allow a user to manually adjust the intensity of the directed light to remote locations; and another adjustment device configured to allow a user to manually adjust the focus of the directed light.

11. An illumination system according to claim 1, wherein the light from the light source and the light transmitting device is configured so as to prevent light from being focused directly into the users eyes.

12. An illumination system according to claim 1, wherein the light transmitting device is a transparent tube lined with optical film which is highly reflective to light striking the surface of the film at certain angles, and is transmissive at other angles.

13. An illumination system according to claim 1, wherein the light source is configured to be a light emitting diode.

14. An illumination system according to claim 1, further comprising:
    a light transmission device including a fiber optic cable, configured to transmit light from the light source to the light output.

15. An illumination system according to claim 1, wherein the power source is configured to be rechargeable by at least one of electronic and manual means.

16. An illumination system according to claim 1, wherein the light transmitting device includes an optical lens.

17. An illumination system according to claim 16, wherein the optical lens is configured to be adjustable by mechanical means to adjust the direction of light in a two dimensional manner to a remote location.

18. An illumination system according to claim 17, wherein an adjustment device is configured as a ball that rotates to adjust directed light.

19. An illumination system for use in conjunction with protective eyewear comprising:
- a light source embedded in the eyewear;
- a power source, configured to provide power to the light source;
- a power switch embedded within the protective eyewear and configured to activate the system; and
- a light transmitting device embedded within the protective eyewear wherein light intensity and direction of light from the light source are selectively controlled.

20. An illumination system according to claim 19, further comprising:
- a mechanical adjustment device configured for manual adjustment by a user to manually adjust the intensity of the light output to a remote location.

21. An illumination system according to claim 20, wherein the adjustment device is configured as a dial for adjusting the intensity of the light.

22. An illumination system according to claim 20, wherein the adjustment device is configured as a push button switch of predetermined number of positions, preset to provide a plurality of light intensity levels.

23. An illumination system according to claim 20, wherein the adjustment device is configured as a touch pad switch for touch adjustment along the pad.

24. An illumination system according to claim 20, wherein the adjustment device is configured to be embedded within the frame of the eyewear.

25. An illumination system according to claim 19, wherein the protective eyewear are sunglasses.

26. An illumination system according to claim 19, wherein the protective eyewear are light adjusting sunglasses.

27. An illumination system according to claim 19, wherein the protective eyewear are safety glasses.

28. An illumination system according to claim 19, further comprising:
- an adjustment device configured to allow a user to manually adjust the focus of the directed light from a focused light point to a relatively broad lighted area.

29. An illumination system according to claim 28, wherein the adjustment device is configured as a dial for adjusting the focus of the light.

30. An illumination system according to claim 19, further comprising:
- an adjustment device configured to allow a user to manually adjust the intensity of the directed light to remote locations; and
- another adjustment device configured to allow a user to manually adjust the focus of the directed light.

31. An illumination system according to claim 19, wherein the light from the light source and the light transmitting device is configured so as to prevent light from being focused directly into the users eyes.

* * * * *